United States Patent
Beyke et al.

(10) Patent No.: US 7,290,959 B2
(45) Date of Patent: Nov. 6, 2007

(54) ELECTRODE HEATING WITH REMEDIATION AGENT

(75) Inventors: Gregory L. Beyke, Franklin, TN (US); Michael E. Dodson, Longview, WA (US); Thomas D. Powell, Vancouver, WA (US); Jerry L. Wolf, Keller, TX (US)

(73) Assignee: Thermal Remediation Services, Longview, WA (US)

( * ) Notice: Subject to any disclaimer, the term of this patent is extended or adjusted under 35 U.S.C. 154(b) by 0 days.

(21) Appl. No.: 10/995,463

(22) Filed: Nov. 23, 2004

(65) Prior Publication Data

US 2006/0110218 A1 May 25, 2006

(51) Int. Cl.
*B09C 1/06* (2006.01)
*B09C 1/08* (2006.01)

(52) U.S. Cl. ............................. 405/128.55; 405/128.8
(58) Field of Classification Search ........... 405/128.55, 405/128.8
See application file for complete search history.

(56) References Cited

U.S. PATENT DOCUMENTS

| | | | |
|---|---|---|---|
| 3,948,319 A | 4/1976 | Pritchett | 166/248 |
| 4,228,854 A | 10/1980 | Sacuta | 166/248 |
| RE30,738 E | 9/1981 | Bridges et al. | 166/248 |
| 4,495,990 A | 1/1985 | Titus et al. | 166/65 |
| 4,545,435 A | 10/1985 | Bridges et al. | 166/248 |
| 4,662,438 A | 5/1987 | Taflove et al. | 166/245 |
| 4,957,393 A | 9/1990 | Buelt et al. | 405/128 |
| 5,286,141 A * | 2/1994 | Vigneri | 405/128.5 |
| 5,316,411 A | 5/1994 | Buelt et al. | 405/128 |
| 5,330,291 A | 7/1994 | Heath et al. | 405/128 |
| 5,347,070 A | 9/1994 | Heath et al. | 588/253 |
| 5,398,756 A | 3/1995 | Brodsky et al. | 166/248 |
| 5,420,402 A | 5/1995 | Bridges et al. | 219/772 |
| 5,449,251 A | 9/1995 | Daily et al. | 405/128 |
| 5,545,803 A | 8/1996 | Heath et al. | 588/253 |
| 5,558,463 A * | 9/1996 | Geisel | 405/128.55 |
| 5,907,662 A * | 5/1999 | Buettner et al. | 392/301 |
| 5,954,452 A * | 9/1999 | Goldstein | 405/128.55 |
| 5,975,799 A * | 11/1999 | Carrigan et al. | 405/128.35 |
| 5,994,670 A | 11/1999 | Buettner | 219/213 |
| 6,073,695 A * | 6/2000 | Crawford et al. | 166/303 |
| 6,485,232 B1 * | 11/2002 | Vinegar et al. | 405/128.85 |
| 6,533,499 B2 * | 3/2003 | Breeding | 405/128.75 |
| 6,596,142 B2 | 7/2003 | McGee | 204/515 |
| 6,596,190 B1 * | 7/2003 | Igawa et al. | 252/188.1 |
| 2002/0013508 A1 * | 1/2002 | McGee | 588/227 |

FOREIGN PATENT DOCUMENTS

| | | |
|---|---|---|
| CA | 2123410 | 5/1993 |
| CA | 1322106 | 9/1993 |
| DE | 692 28 194 T2 | 5/1993 |
| EP | 0 612 273 B1 | 5/1993 |
| WO | WO 93/09888 | 5/1993 |

\* cited by examiner

*Primary Examiner*—John Kreck
(74) *Attorney, Agent, or Firm*—Schnader Harrison Segal & Lewis, LLP (57) ABSTRACT

A remediation method and system is disclosed. A plurality of conductors is installed into the subsurface to introduce electrical current to produce heat in the subsurface. One or more agents are released into the subsurface to cause or accelerate the decomposition of one or more pre-existing halogenated organic compounds and release halogen ions, improving electrode performance.

19 Claims, 5 Drawing Sheets

FIG 1

PRIOR ART

PRIOR ART

ELECTRODE HEATING WITH REMEDIATION AGENT

FIELD OF THE INVENTION

The invention pertains to remediation using electrical resistance heating (ERH) with a remediation agent, and more particularly the dehalogenation of an organic compound that is considered to be a contaminant.

BACKGROUND OF THE INVENTION

ERH is an in situ technology that heats subsurface soil and groundwater, usually for the purpose of removing environmental contaminants such as volatile organic compounds (VOCs). Common VOCs include many halogenated compounds—industrial solvents such as trichloroethene (TCE) and pesticides such as ethylene dibromide. As the subsurface is heated, VOCs are driven into the vapor phase and soil moisture is boiled into steam. The resulting steam and VOC vapor mixture is removed from the subsurface by applying a vacuum that draws the gases into a well and pulls them to the surface for treatment.

ERH uses the heat generated by the resistance of the soil matrix to the flow of electrical current to raise subsurface temperatures. ERH is equally effective in water saturated and unsaturated (vadose zone) soils. To implement the technology, electrodes are placed into the ground so that they are spaced throughout a targeted contaminated region. The vertical limits for ERH are set by the depth to which boreholes for electrode construction can be drilled. Alternatively, electrodes can be installed by pile driving—inserting a circular pipe or sheet pile into the subsurface.

The ERH electrodes conduct electrical current into the subsurface and are designed to input electrical current into the targeted depth interval. The subsurface interval that is exposed to electrical resistance heating is called the conductive interval. In the conductive interval, the electrode construction materials are non-insulated and the borehole annulus is packed with a conductive material to increase the effective diameter of the electrode. In those portions of the subsurface where electrical resistance heating is not required, the electrode construction materials are electrically insulated and the borehole annulus is filled with relatively non-conductive materials such as sand, bentonite, or neat cement grout. Drilled electrodes are typically 8-12 inches in diameter and spaced 12-24 feet apart, though sizes and spacing outside of these common ranges are occasionally used.

Figure 1:
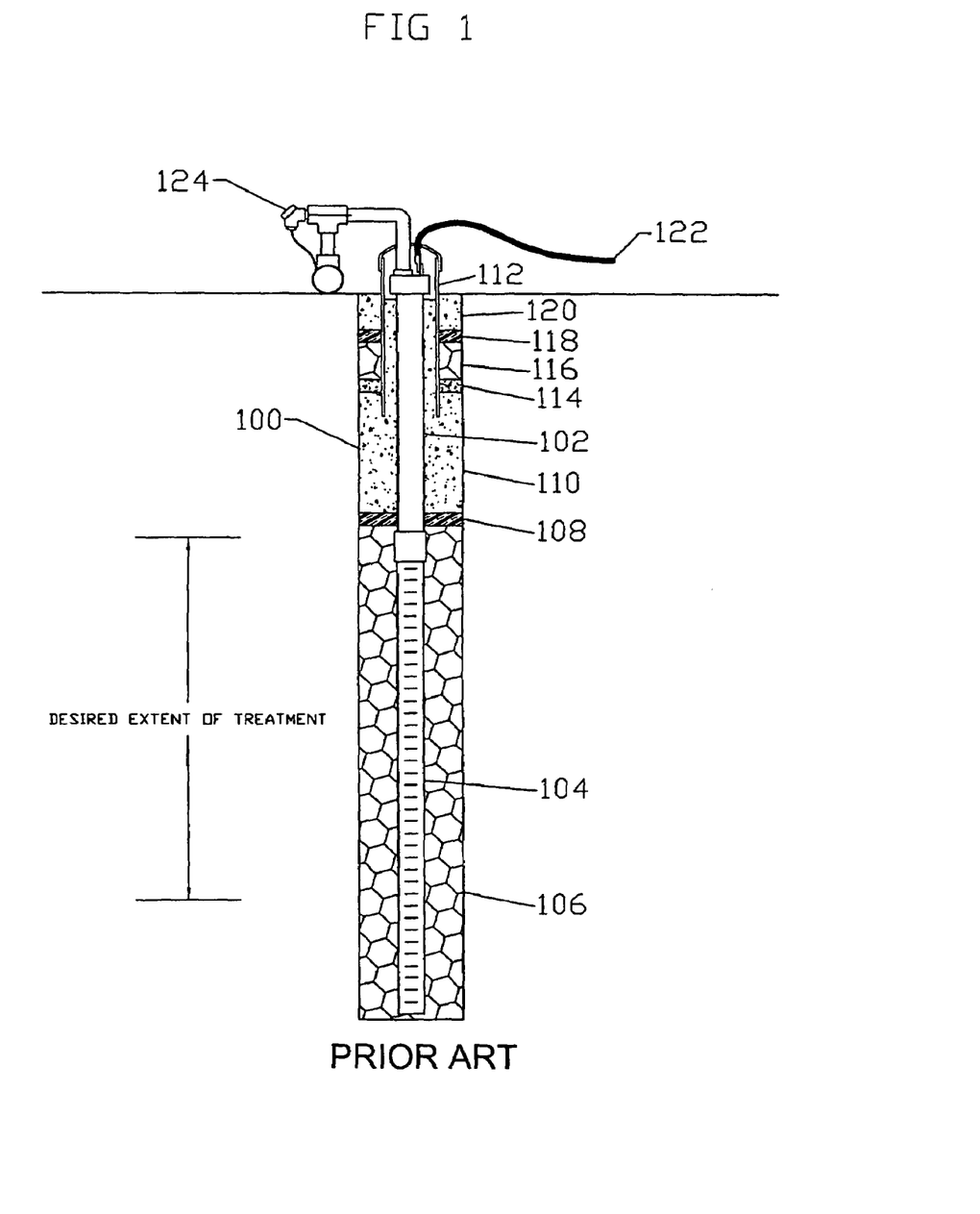
FIG. 1 depicts an illustrative example of a prior art electrode.

FIG. 1 depicts an illustrative simple bored (drilled) electrode, referred to as a "pipe electrode". A borehole 100 is created. A galvanized or low carbon steel screen 104 having a diameter of 4 inches is inserted in borehole 100 and extends from the total depth. A galvanized or low carbon steel casing 102 also having a diameter of 4 inches, is inserted into borehole 100, beginning at the top of screen 104 and extending to just above grade surface. In the provided example, screen 104 is surrounded with conductive backfill 106, however, the conductive backfill depth interval does not usually coincide with the length of the screened interval as shown here. The conductive backfill interval 106 is the region where the electrical current flows through the soil. A layer of Bentonite clay 108 or other relatively non-conductive material, surrounds galvanized casing 102 just above galvanized screen 104. Above Bentonite clay 108 is a layer of cement grout 110. An oversleeve 112 having a diameter of approximately 8 inches and preferably made of chlorinated polyvinyl chloride (CPVC) surrounds the upper portion of galvanized casing 102. Within the depth of oversleeve 112 are the following layers stacked upwardly: sand 114, conductive backfill 116, bentonite clay 118 and cement grout 120. Sand layer 114 is typically fine masonry sand and is inserted in the borehole to prevent the upper particle layers from sinking into the wet cement grout as they are added to the borehole during construction. The upper section of conductive backfill 116 is the subsurface neutral. The subsurface neutrals for all electrodes are shorted together by a small wire (not shown)—this damps down the near-surface voltage gradients for personnel safety. Bentonite clay layer 118 prevents liquid cement grout 120 from seeping down into permeable conductive layer 116 as the liquid grout is added to the borehole during construction; alternatively, fine masonry sand could be used instead of Bentonite clay. A power cable 122 is connected to electrode 100 to conduct an electrical current. It will be understood by those skilled in the art that other electrode configurations are possible, including different types of conductive and non-conductive materials.

In the provided example electrode, a thermocouple 124 is situated to monitor the temperature of gases that are being extracted from electrode 100 by vacuum. It is often also necessary to monitor temperatures at various depths in the subsurface. Such temperature monitoring can be performed using temperature monitoring points (TMPs) that contain a plurality of thermocouples.

Figure 2:
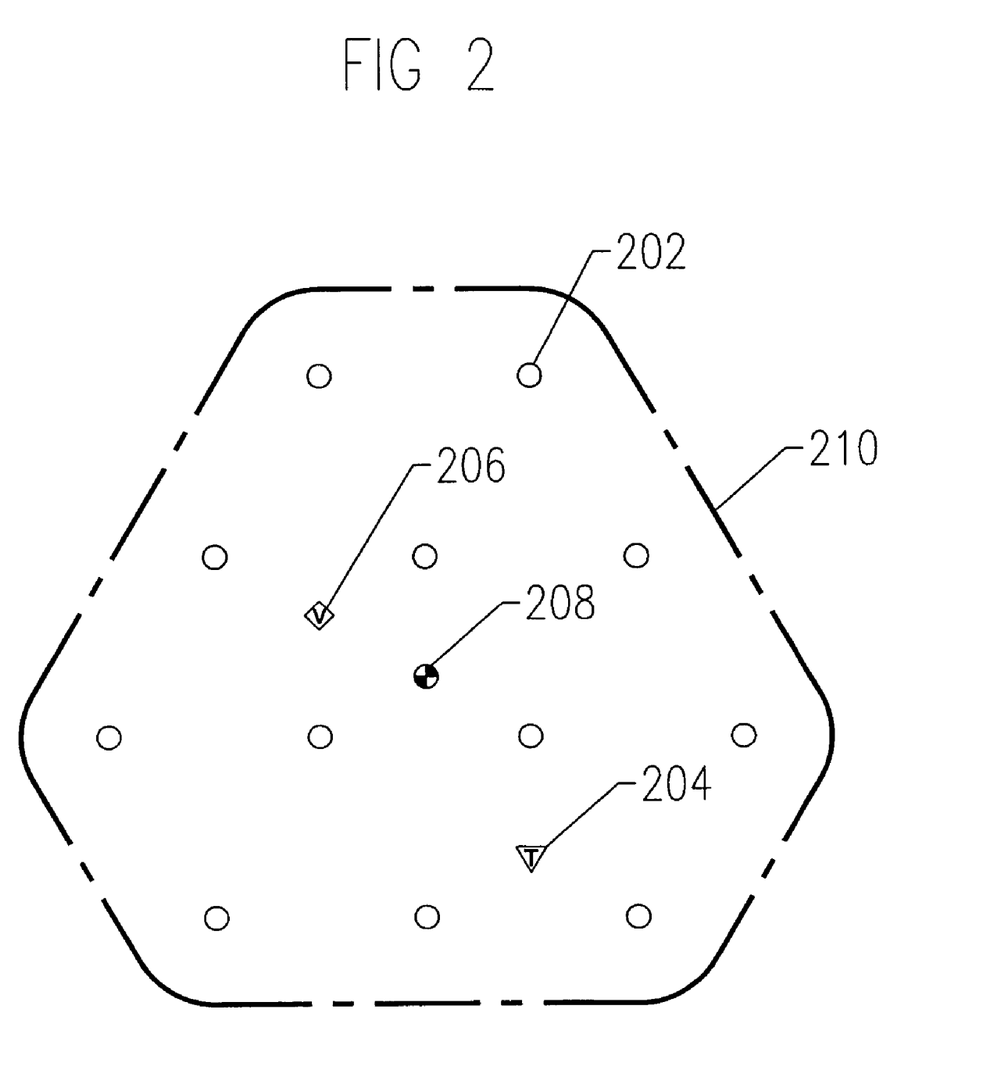
FIG. 2 depicts an illustrative plot plan of a contaminant remediation site.

FIG. 2 depicts an illustrative plot plan of a remediation site with a treatment area 210. Circles 202 represent electrodes, which also serve as vapor recovery wells. Triangular marking 204 represents a TMP. Diamond 206 is a vapor recovery well that does not serve as an electrode. Shaded circles 208 are co-located monitoring wells and TMPs.

An ERH power control unit (PCU) is used to control the voltage that is applied to the subsurface. Each electrode differs in electrical phase from all of the electrodes that surround it and will thus conduct current to adjacent out-of-phase electrodes. Resistance by the subsurface environment to this flow of electrical current heats the soil and groundwater between the electrodes.

Figure 3:
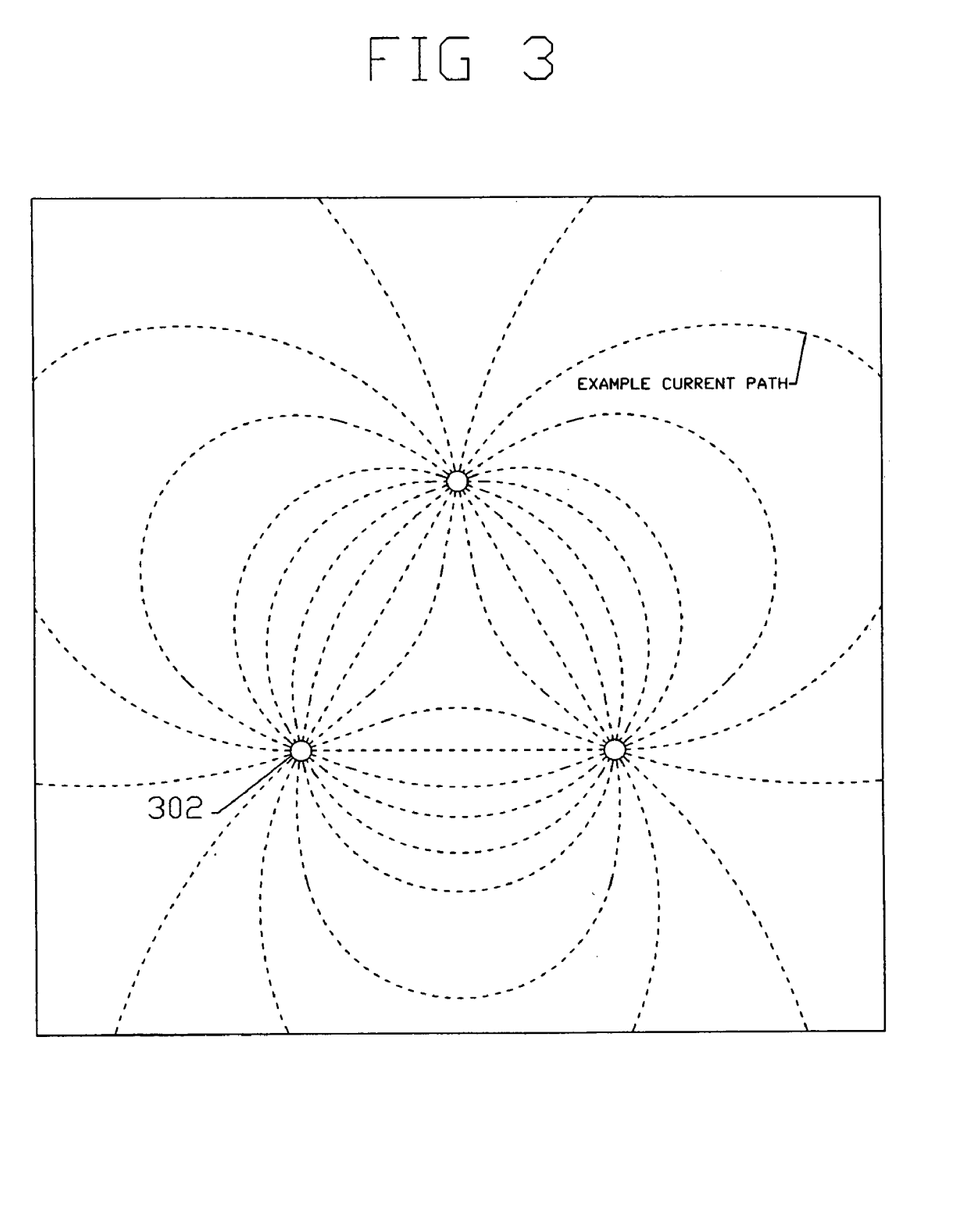
FIG. 3 is an illustrative depiction of the current density in the vicinity of a plurality of electrodes.

However, the electrical current does not uniformly heat the subsurface. Geometry causes the current flux or current density to be higher near the electrodes. This effect is most apparent when considered from a plan view perspective as shown in FIG. 3. The regions within a few inches of electrodes 302 have a higher current flux as shown by the broken lines, and therefore heat more quickly than other regions. This non-uniform heating is undesirable because it is less energy efficient. In addition, most applications of ERH require heating to the boiling temperature of water. A higher current flux at the electrode-soil interface would lead to stronger boiling there. If the soil immediately adjacent to the electrode begins to dry out, then its local resistance will begin to increase; this can lead to a vicious cycle—more resistance, more heating, more drying, more resistance, etc. Electrode dryout can lead to a condition in which the electrode becomes essentially non-conducting.

It is common practice to drip water into the vadose zone portion of electrodes in order to combat electrode dryout. Alternatively, the electrode may be cooled to prevent dry out. It is also common practice to add conductive ions to the electrode, either as solids or liquids during installation of the electrode or in water-dissolved form in conjunction with electrode drip water. The conductive ions reduce the local soil resistance, reduce local heating, and ease dry-out problems. One could say that drip water and electrode cooling treat the symptom (higher heat due to greater current flux) while adding conductive ions treats the problem by reducing the heat generated by the higher local current flux. In theory, though never achievable in practice, one could establish the proper conductivity gradient with radial distance from the electrode to match the current flux over that radial distance to provide absolutely uniform heat generation. In this ideal scenario, the concentration of conductive ions should be inversely proportional to radial distance (for a cylindrical electrode)—i.e. the slope of the gradient should be steep.

The addition of conductive fluids has two disadvantages:
1. If conductive ions are added only during electrode installation, then diffusion of the ions will reduce their concentration over time and reduce the impact of the addition. Even if the ions are added in conjunction with drip water, the flow of the drip water itself can easily transport the ions away from the electrode. Under either scenario, the slope of the concentration gradient tends to be too broad and flat.
2. All conductive ions (at least at effective concentrations) are considered to degrade the quality of the groundwater and are to some extent counter-productive to the goal of restoring the groundwater to optimal conditions.

Accordingly, there is a need to produce a conductive ion concentration gradient that more closely approaches the theoretical ideal to enhance ERH and related remediation processes.

SUMMARY OF THE INVENTION

The present invention includes a remediation method and system. A plurality of conductors is installed into the subsurface to introduce electrical current to produce heat in the subsurface. One or more agents are released into the subsurface to cause or accelerate the decomposition of one or more pre-existing halogenated organic compounds and release halogen ions. The continual production of conductive ions in or near the electrode can improve electrode performance, thereby optimizing ERH and further promoting remediation.

DESCRIPTION OF THE FIGURES

The invention is best understood from the following detailed description when read with the accompanying drawings.

DETAILED DESCRIPTION OF THE INVENTION

ERH is optimized by improving electrode performance. Better electrode performance results if the conductive ions are continually produced within (or near) the electrode. Outward diffusion of these ions produces a concentration gradient that more closely approaches the theoretical ideal. From a mathematical sense, the diffusion of ions from an electrode and the "diffusion" of current are the same process—the shape of the current density curve and shape of the concentration gradient curve would be identical.

According to the present invention, conductive ions are continually produced in or near the electrode by adding an agent, such as a dehalogenation agent, or other contaminant decomposing agent, to cause or enhance the chemical or bio-chemical decomposition of one or more existing subsurface contaminants. Preferably the agent is introduced within two electrode radii from the outer surface of the electrode, more preferably within one electrode radii and most preferably from within the electrode. In most cases, the removal or destruction of the contaminant(s) would be the overall goal of the ERH process.

Figure 5A:
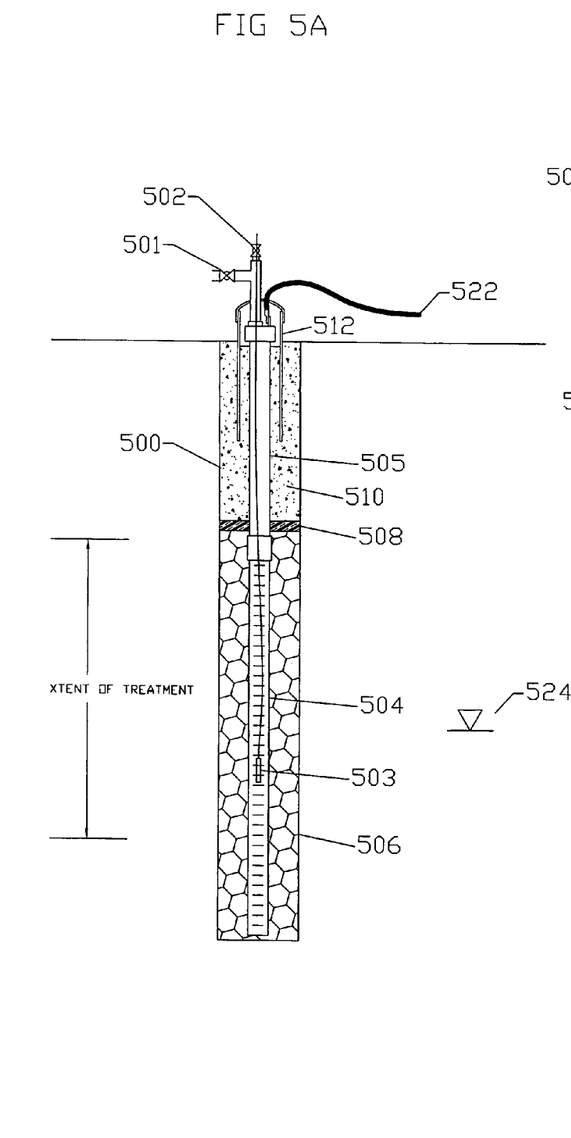
FIGS. 5A and 5B depict an exemplary electrode used in an illustrative embodiment of the invention.
Figure 5B:
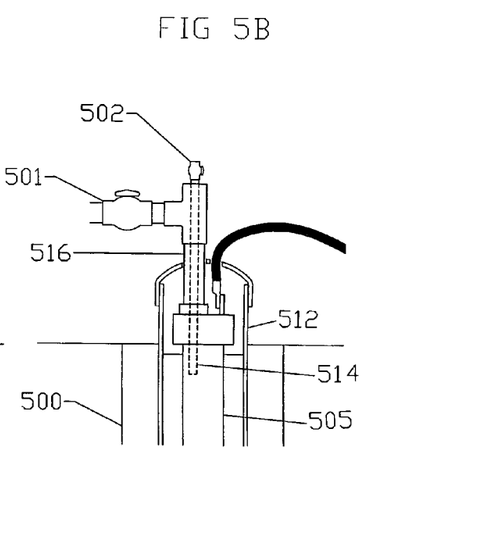

The present invention may be implemented using a pipe electrode as was described above and depicted in FIG. 1. Other conductive elements are also within the spirit and scope of the invention. A further example of a conductive element is provided in FIGS. 5A and 5B. An illustrative desired extent of treatment is shown to the left of the electrode and water table level 524 is shown at to the left. Borehole 500 contains casing 505. An over-sleeve 512 is disposed around casing 502. A power cable 522 is functionally connected to the electrode. Screen 504 is surrounded by conductive backfill 506. A layer 508 of relatively non-conductive material is provided just above casing 505. Cement grout 510 may be disposed around casing 505 above non-conductive layer 508. Pipe 501 is piping to the vapor recovery system. Preferably a ball valve is positioned in the piping to isolate or turn off the recovery from a well. An access port 502 is provided to the well casing. This port may also be closed with a ball valve. A threaded plug is another example of a closing mechanism. A ball valve provides straight-through passage when opened (i.e., you can look through the valve). Access port 502 could be used for a number of purposes:

To add a dehalogenating agent (DA) or other decontaminant to the electrode: If the DA is added before vapor recovery (VR) is initiated or another time when the VR system is shut down to the well, then the DA could be just poured or pumped down the well. If the desire is to add the DA continuously while VR is operating, then a small diameter "tailpiece" should be inserted to direct the DA down the well and prevent the VR system from sucking it out before it is effective. FIG. 5B depicts an enlarged view of the top of the conductive component of FIG. 5A showing tailpiece 514 by broken lines. Tailpiece 514 is a small insertion pipe that extends down inside of larger pipe 516 that is used for vapor and steam recovery from the electrode/well.

To remove a water sample from the well: The water sample could be analyzed for a number of parameters to gauge the effectiveness of the DA. The simplest measurement would be electrolytic conductivity (EC), which would be a direct measurement of the DA effectiveness from an ERH standpoint.

FIG. 5A shows an EC or other sensor 503 inserted through access port 502. Sensor 503 could be inserted periodically and manually to measure the conductivity. The rate of change of EC would likely be fairly slow so a periodic manual measurement would typically be most suitable, however, the EC sensor could be permanently mounted in a portion of the ERH electrodes and the EC could be monitored continuously if desired. The output of the EC sensor could be used to adjust the rate of DA addition.

An alternative conductive element design is a cable electrode in which the electrode consists of a metal plate that is bolted to an insulated wire. The metal plate is surrounded by a conductive backfill as in a pipe electrode. Preferably, a tube is included within the borehole of a cable electrode to act as a conduit to allow injection of the contaminant decomposing agent. Further examples of conductive elements include designs in which one or more cable electrode elements are located below a shallower pipe electrode element, an illustrative example of which is depicted in FIG. 4.

Water samples may also be withdrawn through the tube inserted in a cable electrode, as they can be in a pipe electrode, to monitor the effectiveness of the contaminant decomposing agent. Effectiveness can be monitored in many ways that are known in the art. Additionally, electrical conductivity can be measured, which would indicate the amount of chloride or other ions that are present. As chloride is produced from the degradation of chlorine-containing materials, its presence can be a measure of the extent of degradation for those materials. This can hold true for other halogen containing materials.

Figure 4:
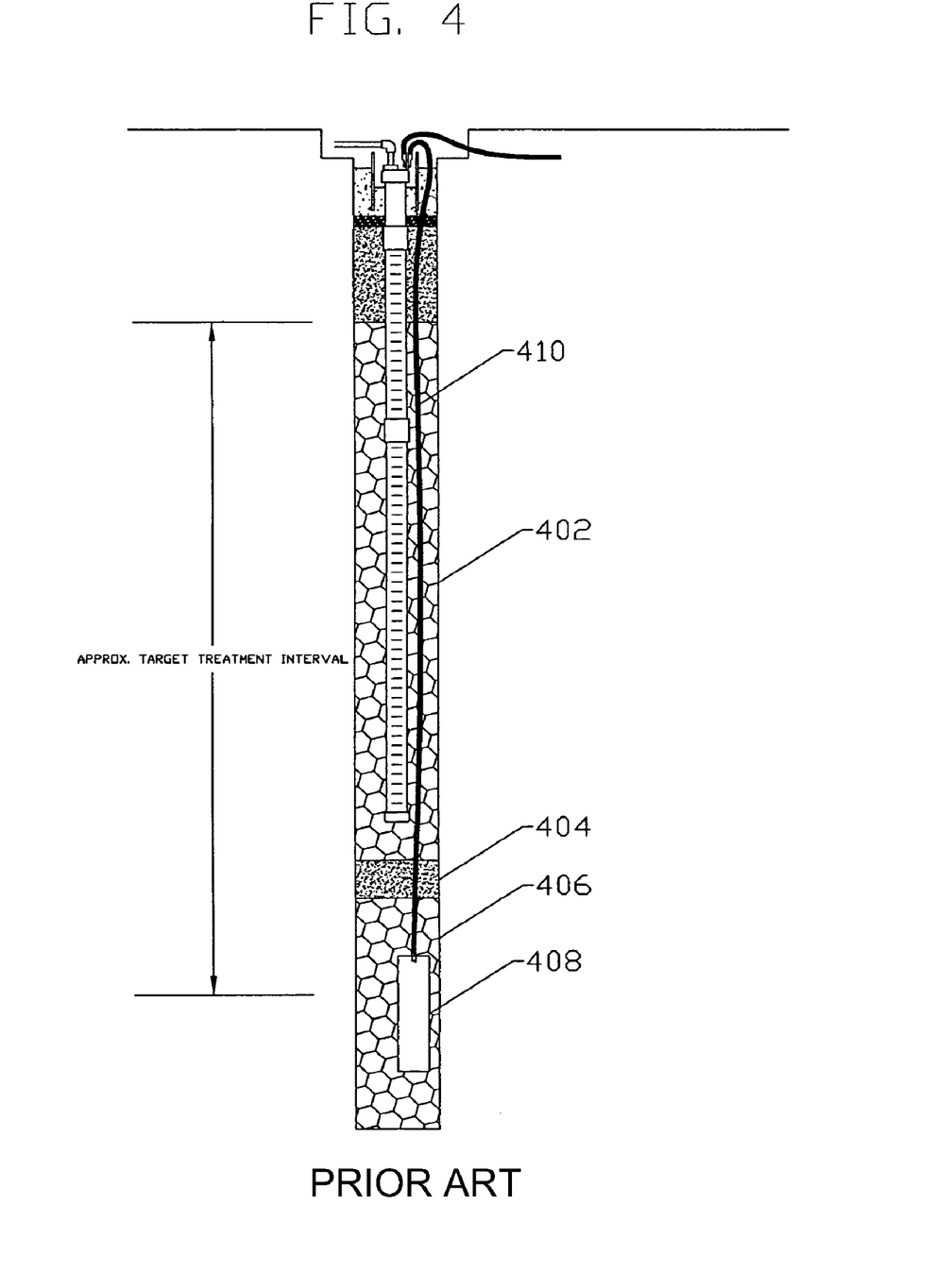
FIG. 4 depicts a further illustrative example of a prior art electrode.

FIG. 4 depicts an illustrative example of a combination of a pipe electrode and a cable electrode. A pipe electrode 402 extends to an intermediate depth. Below that is a non-conductive material layer 404. Below non-conductive material 404 is conductive backfill 406 in which an electrode plate 408 is disposed. A power cable 410 extends to electrode plate 408 to energize the cable electrode portion of the combination electrode. These different elements are electrically isolated from each other and each element allows injection of current into independent depth intervals. This configuration is considered to be an "electrode with multiple electrode elements". In a pipe electrode, cable electrode or combination thereof, the pipe or cable allows the longitudinal flow of current from the surface down to the conductive backfill where the current turns and enters the soil.

The decomposition of any halogenated compound will release electrically conductive halogen ions. Other contaminant decomposition may also release ions. Such a release in or near an electrode would increase ERH performance. As described above, halogenated compounds are some of the principal environmental contaminants. Chlorinated compounds are more common than brominated (bromine containing) compounds, which in turn are more common than other halogenated compounds.

There are several established decomposition mechanisms to decompose halogenated compounds and several methods to enhance these processes. The principal mechanisms are summarized below, although other methods exist that decompose contaminants and result in ion production. Common terms are used for each, as opposed to all-encompassing terms (i.e. "chlorinated" instead of "halogenated").

1. Anaerobic dechlorination by soil microbes—microbes consume the chlorinated compound, use the chlorine as an oxidizing agent ("electron acceptor") and then release the chloride ion to the environment. Anaerobic dechlorination is most commonly enhanced by adding an "electron donor" to the subsurface as an additional food source for soil microbes. These electron donors include agents such as molasses, sodium lactate, edible oils, and many others. One can think of the microbes as reacting the electron donor with the electron acceptor, harvesting the energy, and then releasing the chloride ion with the other waste products. In other cases, anaerobic dechlorination could be enhanced by adding some microbe nutrient or perhaps even by adding a new population of microbes to the subsurface.

2. Reductive dechlorination—an electron donor is added to the subsurface and chemically reacts with the halogenated compound without any biological process. The most common electron donor used for reductive dechlorination is zero-valent iron. Other metals, of course would function in a similar manner. Zero-valent iron is the type found in steel, "Zero valent" means "non-rusted". In effect, the steel "rusts" or oxidizes by reacting with the chlorinated compound. This process releases chloride ions. Iron is usually installed as solid granules. Sometimes the iron is manufactured as a powder, even "nano-scale iron", mixed with a thick fluid (suspended), and injected as a fluid mixture or suspension. Sometimes the iron is added in conjunction with other electron donors, such as molasses.

3. Chemical oxidation—a strong electron acceptor or oxidant is injected into the subsurface. This oxidant reacts with the carbon atom or hydrogen atoms that comprise a halogenated organic compound. As the organic compound is destroyed, the halogen ions are released. Common oxidants include concentrated hydrogen peroxide, ozone, permanganates, and persulfates. With the exception of ozone, the oxidants tend be injected as liquids.

4. Hydrolysis—hydrolysis is a water substitution reaction, whereby water reacts with the organic compound and releases halogen ions. In general, no additives are required to encourage hydrolysis, the process of heating increases the reaction rate. However, some halogenated compounds will hydrolyze more rapidly under high pH (basic) conditions, conditions that produce more hydroxyl ($OH^+$) ions. For such compounds, any agent that increases pH will speed the process.

5. Catalysts—No catalysts are known to be presently used in situ to remediate organic compounds. The reason is that the cost of large amounts of catalyst would be excessive. However, when selectively producing halogen ions near the electrode, which is desirable according to the present invention, then the small amount of required catalyst might be worth the cost.

In the existing technology, if ERH is used at the same site as a de-halogenating agent, then the use is not synergistic—the dehalogenating agent is dispersed essentially uniformly through the contaminated region. Under the existing technology, the dehalogenating agent is inserted after the ERH process is complete—no benefit to ERH can be experienced, the only possible synergy would be in the other direction, the heat from ERH makes viscous fluid more tractable or speeds the reaction rates of the agent.

Advantageously, the decontamination agent not only may address the contamination problem directly, it also enhances ERH, thereby improving the effect of the agent. Conductive ions generated by the decontamination agent create a steeper ion gradient, thereby approaching the ideal, and thus enhancing ERH. Examples of how the heat input by the ERH process can improve the effect of the decontamination agent are given below as applied to the dehalogenation process:

1. Liquid dehalogenating agents are often viscous; some examples include molasses and nano-scale iron suspensions. The heat input of ERH reduces the viscosity and makes it easier to pump the liquid into the subsurface.

2. Most chemical reactions are governed by the Arrhenius Equation; the reaction rates increase with temperature. A rule-of-thumb for the Arrhenius equation says that "a 10° C. temperature increase doubles the reaction rate". By this rule-of-thumb, increasing the temperature of the subsurface to 100° C. will increase the reaction rates by a factor of about 500.

3. Biological reaction rates also increase with temperature. Almost microbes become more active as temperatures increase up to 37° C. Some microbes continue to increase in activity up to 60° C.

Accordingly, in a broad sense the invention can be described as a remediation method involving installing a plurality of conductors into the subsurface to generate current to produce heat in the subsurface, and releasing one or more agents to cause or accelerate the decomposition of one or more contaminants, such as halogenated organic compounds. The agent causes a release of conductive ions by decomposing contaminants, which, enhances the heating process, and in turn improves the further decomposition of contaminants.

The agents may be released in a variety of ways. For example, the agents can be released at one time or be released for a period of time at certain intervals, i.e. discretely. Discrete intervals are most likely to be weeks or months, but shorter or longer intervals are within the scope of the invention. Numerous factors may determine at what intervals agents are released. For example, interval length may be dependent on type and concentration of contaminant, type of agent and presence of other materials. In a preferred embodiment of the invention, the agents can be released continuously over a period of time. Any of these releasing methods can also be combined with one another over a period of time.

The release of the agents can be facilitated by any number of methods. Illustrative examples include gravity feeding, injecting and pumping the agent into the subsurface.

The decomposition agent may also be released at different times with respect to when the conductor is inserted and energized. For example, the agent may be released before energizing the conductor, during the time in which the conductor is energized, or after the conductor is energized.

The agent will generally be selected from the group consisting of, oxidant, bio-stimulant, catalyst, water in combination with a pH-increasing agent, and reducer, or a combination thereof, however, other decontamination agents are within the spirit and scope of the invention, provided that their use produces ions.

In an exemplary embodiment of the invention, the conductor is a pipe electrode, however, it may also be a cable electrode, a combination thereof or any other conductor that can create a current gradient to heat the subsurface. The conductors may be inserted in any direction into the subsurface, such as horizontally, vertically or any angle non-perpendicular to the surface. They can be inserted to any depth reachable by drilling, pile driving or other insertion technology.

Preferably the electrode "conductive interval" matches up within a few feet of the contaminated interval where heating is desired. In an exemplary embodiment of the invention the conductive interval is biased a few feet deeper than the contaminated interval due to convective heat transfer (heat rises)—the amount of downward bias increases if the soil is gravel or other type that allow water to flow easily. Illustrative downward bias intervals are in the range of about 1-10 feet, and more preferably about 1-4 feet.

The current and voltage required to attain a desired temperature are determined by the soil and groundwater electrical conductivity. More conductive soils (high total dissolved solids) such as brackish or marine environments require very low voltage and high current. Gravel soils in regions with high rainfall tend to require high voltage and low current. A very conductive site (marine) might require 20 volts (phase to neutral) and 1000 amps per electrode. A very low conductivity site might require 1000 volts and 20 amps. An "average" site would require about 135 volts and 150 amps.

Reducing agents such as metals can be used to generate conductive ions. Although metal backfill has previously been incorporated into electrodes to conduct current, and could thus release ions to enhance remediation, its possible use in this fashion has not been before recognized, and therefore, not developed. The inventors of the present invention have recognized this use of backfill and have accordingly developed guidelines for the success of such use. Electrode backfill is typically spherical and ⅛ inches (0.125") to 3/16 inches (0.1875") in diameter, such as the case with steel shot. To use backfill to optimize ERH by improving conductive ion concentration, the metal pieces must produce conductive ions are preferably smaller in diameter than the metal backfill generally used to create an electrode for contaminant remediation processes, so a greater concentration of conductive ions will be produced as compared to metal pieces having larger diameters. In an illustrative embodiment of the invention, metal pieces, having diameters less than about 0.10 inches, and more preferably less than about 0.08 inches, are placed within and/or near the electrode. Illustrative ranges of diameter are about 0.02 inches to 0.10 inches and about 0.05 to 0.07. More importantly, the inventors have recognized that steel shot that is manufactured by cold working has less iron oxide on its surface than steel shot that is produced by hot working. Shot with less surface iron oxide has more exposed zero-valent iron on its surface and is more effective as a dehalogenating agent.

The invention further comprises a system for contaminant remediation. The system includes a plurality of conductors, such as those depicted in FIGS. 1 and 4. An agent insertion device is also included, such as an injection device or a pumping device.

While the invention has been described by illustrative embodiments, additional advantages and modifications will occur to those skilled in the art. Therefore, the invention in its broader aspects is not limited to specific details shown and described herein. Modifications, for example, to types of decomposition agents, conductor configurations and materials may be made without departing from the spirit and scope of the invention. Accordingly, it is intended that the invention not be limited to the specific illustrative embodiments, but be interpreted within the full spirit and scope of the appended claims and their equivalents.

The invention claimed is:

1. A remediation method comprising:
   installing a plurality of conductors into the subsurface to introduce electrical current to produce heat in the subsurface;
   releasing one or more agents to cause or accelerate the decomposition of one or more pre-existing halogenated organic compounds and release halogen ions;
   wherein the one or more agents include steel shot used as a reducing agent.

2. The method of claim 1 wherein the steel shot has an average diameter of less than 0.10 inches.

3. The method of claim 1 wherein at least one agent is released into the subsurface a plurality of times.

4. The method of claim 1 wherein at least one agent is released into the subsurface continuously over a period of time.

5. The method of claim 1 wherein at least one agent is released into the subsurface, and wherein at least one agent is released over a first period of time and at least one agent is released either discretely or continuously over a subsequent period of time.

6. The method of claim 1 wherein at least one agent is released before energizing the conductors.

7. The method of claim 1 wherein at least one agent is released while the conductors are energized.

8. The method of claim 1 wherein at least one agent is released after the conductors are energized.

9. The method of claim 1 wherein at least one of the contaminant decomposing agents is selected from the group consisting of oxidant, biostimulant, catalyst, reducing agent and water with a pH increasing agent, or a combination thereof.

10. The method of claim 1 wherein at least one conductor is selected from the group consisting of pipe electrode, cable electrode or a combination thereof.

11. The method of claim 1 wherein the conductor is formed by:
    boring a hole in the ground;
    providing a casing in the borehole; and
    providing a conductive backfill within the casing.

12. The method of claim 1 wherein at least one of the conductors is inserted horizontally with respect to the ground surface.

13. The method of claim 1 wherein at least one of the conductors is inserted vertically with respect to the ground surface.

14. The method of claim 1 wherein at least one of the conductors is inserted at an acute angle with respect to the ground surface.

15. The method of claim 1 wherein at least one agent is released within two radii from the outside surface of at least one conductor.

16. The method of claim 1 wherein at least one agent is released within one radius from the outside surface of at least one conductor.

17. The method of claim 1 wherein at least one agent is released from within at least one conductor.

18. The method of claim 1 wherein at least one agent is released by injecting it into the subsurface.

19. The method of claim 1 wherein the agent is released by pumping it into the subsurface.

* * * * *